US010116380B1

(12) United States Patent
Freedman et al.

(10) Patent No.: US 10,116,380 B1
(45) Date of Patent: Oct. 30, 2018

(54) SATELLITE PROCESSOR OPERATING SYSTEM

(71) Applicant: Kythera Software, Inc., Washington, DC (US)

(72) Inventors: Jeffrey Freedman, Laurel, MD (US); David Marshack, Bethesda, MD (US); Erik Halvorson, Vienna, VA (US)

(73) Assignee: Kythera Software, Inc., Bethesda, MD (US)

( * ) Notice: Subject to any disclaimer, the term of this patent is extended or adjusted under 35 U.S.C. 154(b) by 0 days.

(21) Appl. No.: 15/211,136

(22) Filed: Jul. 15, 2016

Related U.S. Application Data

(60) Provisional application No. 62/192,900, filed on Jul. 15, 2015.

(51) Int. Cl.
  *H04W 4/00* (2018.01)
  *H04B 7/185* (2006.01)
  *H04W 16/28* (2009.01)
  *H04W 8/22* (2009.01)

(52) U.S. Cl.
  CPC .......... *H04B 7/18517* (2013.01); *H04W 8/22* (2013.01); *H04W 16/28* (2013.01)

(58) Field of Classification Search
  CPC ....... H04W 4/02; H04W 16/28; H04W 4/025; H04W 16/00
  USPC ..................... 455/450, 451, 452.1
  See application file for complete search history.

(56) References Cited

U.S. PATENT DOCUMENTS

2010/0120359 A1*  5/2010  Agarwal ............ H04B 7/18539
                                                                    455/12.1

* cited by examiner

*Primary Examiner* — Tu X Nguyen
(74) *Attorney, Agent, or Firm* — Fish & Richardson P.C.

(57) ABSTRACT

A request to register a function of the application module with a system manager may be received. The request may describe one or more inputs to the function, one or more outputs of the function that are used to generate a beam plan for a satellite, and one or more capabilities that the satellite must have for the function to be used. It may be determined whether one or more capabilities of the satellite satisfy the described one or more capabilities that the satellite must have for the function to be used. In response to determining satisfaction, an indication that the function of the application is available may be provided to a client. A request may be received from the client to generate the beam plan for the satellite using the function. The beam plan for the satellite may be obtained using the one or more outputs of the function.

20 Claims, 7 Drawing Sheets

SATELLITE PROCESSOR OPERATING SYSTEM

CROSS-REFERENCE TO RELATED APPLICATIONS

This application claims priority to U.S. Provisional Application No. 62/192,900 filed on Jul. 15, 2015, and titled "Satellite Processor Operating System," which is incorporated herein by reference in its entirety for all purposes

TECHNICAL FIELD

The following disclosure is related to a satellite management system.

BACKGROUND

Some communication systems can connect geographically distributed users through satellites, or terrestrial connections, or a combination of both. A satellite may provide multiple beams for connecting the geographically distributed areas.

SUMMARY

The present disclosure describes methods, systems and devices for satellite management. A satellite processing operating system may be a platform for command, control, access, and maintenance of satellites. The system may enable application modules that provide various functionality to be added, removed, or modified and ensure that the satellite is protected from damage.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
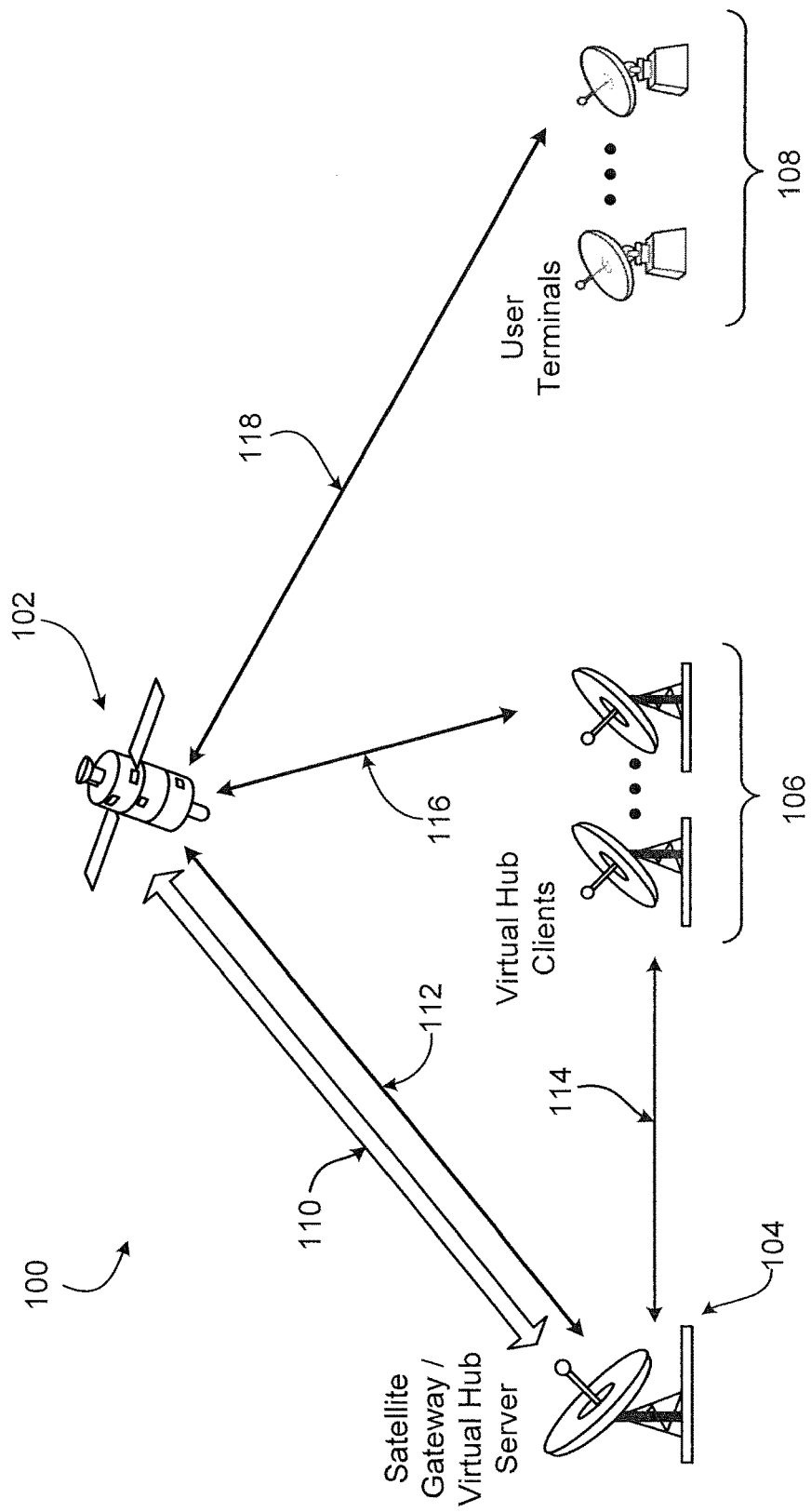
FIG. 1 illustrates an example satellite communications system that is used for satellite management.

In the context of a communications system that uses one or more satellites for connecting users, a satellite may use multiple antenna elements in, for example, a phased array antenna or as part of a reflector antenna, to form one or more communication beams for communicating with user devices on the ground or with other satellites. An antenna element refers to a resonating structure that is designed to transmit or receive electromagnetic energy in a frequency band (for example, a microwave frequency band). In a beamforming satellite system, a signal stream is divided among each of the antenna elements. Beamforming is implemented by adjusting the relative phase and/or gain of each signal path routed to each antenna element to thereby enable the energy radiated by each antenna element to be coherently combined to create a beam pattern composed of one or more beams. The same approach can also be used in the receive direction where the received signals from each receiving antenna element are coherently combined to create the beam pattern.

The beamforming may be accomplished onboard the satellite by constructing a fixed beamforming network behind the element array using processors on board the satellite. Additionally or alternatively, the beamforming may be accomplished using a ground based beamforming (GBBF) system (that is, a system on Earth) that calculates the relative amplitudes and phases that define each intended beam.

Subsequently, the signals from each beam are divided into frequency channels, each of which may have a configurable bandwidth. Selected channels from each uplink beam are then mapped to a second frequency channel. These second frequency channels are then routed to downlink beams. The downlink beams may be created by coherent phase and gain combining of signals produced by individual antenna elements. A table of phase and gain coefficients, which are collectively referred to as the beam coefficients, may be used to create unique shaped beams on the uplink (that is, from the ground to the satellite) or on the downlink (that is, from the satellite to the ground).

Two beams generated near each other that operate in overlapping frequency bands may be referred to as co-channel beams. In some implementations, co-channel beams may receive interference from each other. In such implementations, the generation and use of beams may be coordinated so that satellite resources are not depleted and interference between co-channel beams is minimized.

An RF communication channel or connection that connects two users can be formed using four beams, with the communication path from the first user to the second user going from the ground user terminal associated with the first user to the satellite using a first beam and from the satellite to the ground user terminal associated with the second user using a second beam. The two beams may be linked together using a switching fabric on board the satellite. The communication path from the first user to the satellite is on the uplink, and the first beam may be referred to as an uplink beam. The communication path from the satellite to the second user is on the downlink, and the second beam may be referred to as a downlink beam.

A return communication path from the second user to the first user may be established by using a third beam to connect the ground user terminal associated with the second user to the satellite on the uplink, and by fourth beam from the satellite to the ground user terminal associated with the first user on the downlink. Therefore, following the terminology used in this section, the third beam is an uplink beam and the fourth beam is a downlink beam.

Some satellite communication systems provide infrastructure resources to groups of users for establishing their own networks over the satellite communication system. For example, the satellite communication system may be operated by a satellite network provider, which leases out bandwidth on the satellite network to enterprise customers of the satellite network provider. The enterprise customer uses the bandwidth provided by the satellite network to interconnect users of the enterprise customer who may be in diverse terrestrial regions.

In traditional beamforming satellite communication systems, the satellite network provider computes a set of beams, for either a beam-forming satellite or GBBF, that are generally fixed. The satellite network provider configures and fixes beams by determining the areas where the beams are going to be located, the bandwidths and frequencies of the uplink and downlink beams that are to be formed, and the beam switching on the satellite.

Once the beams are computed, the satellite network provider attempts to sell bandwidth on the beams to its enterprise customers. Since the network architecture is generally fixed once the beams are generated, the satellite network provider attempts to match the requirements of its enterprise customers with the existing beams. For example, the satellite network provider may have generated a beam that covers all of South America with a shape similar to that of South America. The satellite network provider may sell service over that beam to an enterprise customer who may have users in South America. By leasing services on that beam, the enterprise customer may interconnect its users who are located in South America.

With the fixed set of beams as described above, the satellite network provider may not be able to accommodate an enterprise customer who may want network coverage in a geographic area that is not covered by any suitable combination of the beams. In such an event, the enterprise customer may have to modify its coverage requirements such that the coverage fits one of the existing beams, or go for a different connectivity other than the satellite communications system, provided such connectivity is available.

In some cases, the satellite network provider may be able to accommodate the enterprise customer seeking coverage in a geographic area that is not suitably covered by any existing beam. However, the resource utilization may not be efficient. For example, the enterprise customer may want network coverage only over Peru, Chile and Bolivia. However, the existing beam available in the set of beams may cover all of South America. Therefore, the satellite network provider may be able to provide service to users of the enterprise customer in Peru, Chile and Bolivia using the beam that covers all of South America. However, this may be inefficient since a substantial area that is available to the beam is not used. The beam also may interfere with other beams that are attempting to provide coverage in other regions of South America.

Some satellite network providers use bandwidth management systems that provision satellite channels from a hub supporting a pool of users communicating over the satellite. Such bandwidth management systems configure channel frequencies, timing and data rates to allow users to communicate. The bandwidth management systems assume that the satellites are static bent pipes with static routing, beam and channel characteristics. In some implementations, independent management may be infeasible because beam and routing functions may interfere and utilize a common pool of resources. The bandwidth management systems may benefit from a fully-flexible beamforming and channelizing satellite network architecture.

From the perspective of an enterprise customer, the beams that are available in a conventional satellite network cannot be customized to the specific needs of the enterprise customer. Instead, the enterprise customer has to adjust its requirements to fit one of the existing beams in the satellite network. For example, the enterprise customer may check the beams that are available in the satellite network by visiting the website of the satellite network provider. The enterprise customer identifies which of the available beams listed on the website best meets the communication service requirements of the enterprise customer and may proceed to select the identified beam.

The enterprise customer may have to update its functional and communication service requirements to match resources provided by the selected beam. For example, the power level of the beams are already fixed by the satellite network provider. The enterprise customer cannot specify the power level requirement that it would like. Instead, once the beam is selected, if the enterprise customer determines that the satellite antennas in its current user terminals does not have enough power for the selected beam, then the enterprise customer will have to buy user terminals with a bigger satellite antenna that can meet the power requirements of the selected beam.

It may be useful to have a flexible satellite communications system in which the generation of the beams are tailored towards the requirements of the enterprise customers of the satellite network provider in real-time using modular functions while also ensuring protection of the satellite and compliance with regulations and agreements. Real-time may refer to that the generation of beams may be automatically tailored in seconds or minutes of the requirements of the enterprise customers instead of hours or days needed for a human administrator to manually tailor the beams. Such a system would allow the enterprise customer to convey its requirements to the satellite network provider, which will allocate beams on the satellite that are tailored towards the communication service requirements of the enterprise customer using the modular functions. Such a system also may provide the ability to update dynamically the beams as the requirements of the enterprise customers change with time, and/or as the satellite network provider adds new enterprise customers that share the satellite resources with the existing customers. Dynamically updating the beams is performed by computers as manually performing calculations may take days, weeks, or months. Such a system may further enable registration and de-registration of application modules that provide functions desired by the enterprise customers. For example, a modular system that provides for functionality access via Application Programming Interface (API) may provide an easy to use interface that may encourage development of a variety of software and systems while at the same time prevent the use of invalid or dangerous configurations of the satellite.

In some implementations, a flexible satellite communications system with dynamic beams may be achieved using a satellite processing operating system. In one such implementation, each enterprise customer may have a dedicated bandwidth management center (BMC) referred to as the Virtual Hub Client (VHC), which is a computer system that is managed by the enterprise customer and supports the users of the enterprise customer. The satellite communications system may include multiple VHCs that are independent of one another and located in disparate regions.

Each VHC determines the requirements of the corresponding enterprise customer based on the values the enterprise customer provides to the VHC. The enterprise customer may provide the VHC requirements through end-user applications used by the enterprise customer. The end-user applications may be third party software running on user terminals that determine what function APIs are available, indicate to the users which functions are available, and permit the users to provide requests using the available APIs. The requirements of the enterprise customer may define a particular communication service need of the enterprise customer (for example, a need to setup a communication path between an office of the enterprise customer located in Los Angeles and an office of the enterprise customer located in Washington, D.C. for a video conference that will take place at a particular date and time, where the communication path is established using a particular beam forming algorithm). The VHC maps the requirements for the enterprise customer to communication service requirements, such as beam, power, bandwidth and routing requirements, and relays the communication service requirements to a central BMC, which is a computer system managed by the satellite network provider and is referred to as the Virtual Hub Server (VHS).

The VHS combines the communication service requirements received from all the VHCs and generates a common resource plan, which is referred to as the unified beam plan, which determines how the satellite resources (that is, beams on the satellite) are to be allocated among the different enterprise customers. In some implementations, the unified beam plan is a data structure (for example, a matrix or a table) that includes entries for all the communication paths through the satellite. For example, the unified beam plan may include information that would enable the satellite to generate all the uplink beams and the downlink beams. For each uplink beam, the corresponding entry in the data structure of the unified beam plan may specify, for example, an identifier of the uplink beam (for example, transmit beam 45), the beam coefficients for configuring the antenna elements to generate the uplink beam, the central frequency for the uplink beam and the bandwidth of the beam. For each downlink beam, the corresponding entry in the data structure of the unified beam plan specifies the identifier of the downlink beam, the beam coefficients for configuring the antenna elements to generate the downlink beam, the central frequency and the bandwidth of the downlink beam, and the power level for the downlink beam. In addition, the unified beam plan also includes information on switching between the beams, that is, which uplink beam will be connected to which downlink beam by the switching fabric on the satellite.

The VHS may also use application modules that provide different functionality desired by end-users. For example, a third party application module may provide for a specific type of beam shaping and when registered with the VHS, the VHS may notify VHCs and end-user applications that the specific type of beam shaping is available. The end-user applications may then indicate to the enterprise customer users that the functions provided by the application modules are available, e.g., display availability on a graphical user interface, and in response, receive requests for beam shaping using that specific type of beam forming provided by the third party application module. Application modules may be software that is packaged to include one or more logically discrete functions and may receive inputs and provide outputs using well-defined interfaces to that each application module can be added or removed.

The VHS communicates the unified beam plan to the VHCs and the satellite. For example, the VHS provides the unified beam plan to the satellite for the satellite to configure the antenna elements on board the satellite to generate the beams based on the unified beam plan and provides the unified beam plan to the VHCs for the VHCs to configure corresponding terrestrial elements.

System, methods and devices are described in the following sections for hierarchical beam management in a satellite communications system. For the purposes of this discussion, the terms "satellite communications system," "satellite network," "satellite processing operating system," and "network" are used interchangeably. The terms "network client," "enterprise customer" and "Virtual Hub Client" (VHC) are used synonymously. The terms "satellite network provider" and "Virtual Hub Server" (VHS) are used synonymously. The terms "communication channel" and "connection" are used interchangeably, with a communication channel or connection being considered between two users. Each communication channel or connection is composed of two or more communication paths, with each communication path being between a user terminal and the satellite (that is, either an uplink or a downlink path). An uplink or a downlink beam is associated with a communication path, depending on the direction of the signal flow.

FIG. 1 illustrates an example satellite communications system 100. The satellite communications system 100 includes a satellite 102 that is connected to a satellite gateway 104 through satellite links 110 and 112. The satellite communications system 100 also includes one or more Virtual Hub Clients (VHCs), which are collectively identified by the label 106 in FIG. 1. The VHCs are connected to the satellite 102 through satellite links 116. Some of the VHCs 106 also may have terrestrial connectivity to the satellite gateway 104, which is indicated by the link 114. The satellite communications system 100 also includes user terminals corresponding to the users of enterprise customers that are serviced by the satellite communications system 100. The user terminals are collectively identified by the label 108. The user terminals 108 may be geographically distributed and connect to the network using via satellite links indicated by 118.

The satellite 102 may be located at a certain orbital location, for example, a low earth orbit, or a medium earth orbit, or a geostationary orbit. While only a single satellite 102 is shown, a plurality of satellites may be used. The satellite 102 connects the gateway 104 to the VHCs 106 and the user terminals 108, and VHCs 106 to their respective user terminals 108. The satellite 102 also interconnects user terminals 108 that are in disparate locations via RF communications channels created over spot beams covering the disparate locations. While only a single gateway 104 is shown, multiple gateways may be employed.

The satellite 102 may include one or more computer processors on-board, which may be used to perform beamforming calculations to form desired beam patterns. The satellite 102 may include multiple antenna elements or feeds to enable transmission of information in both directions from the satellite 102 to the gateways or user terminals. The antenna elements transmit signals to or receive signals from the satellite gateway 104, the VHCs 106 and the user terminals 108.

A processor on board the satellite 102 may sample signals from each of the incoming RF channels. The processor may combine the phase and gain of individual RF antenna elements to create receiving radiating beams. Other RF or optical feed elements also may be received at the processor in isolation to create signal element uplink beams.

In some implementations, the satellite 102 is a direct radiating satellite that includes an array of elements that instead directly radiate energy from the satellite to the Earth or directly receive energy from the Earth without the energy being reflected or redirected by any surface or dish on the satellite. In other implementations, the satellite 102 is a reflecting satellite that includes multiple reflecting dishes for reflecting or redirecting the energy used to form the beams.

The satellite gateway 104 includes one or more modules that process signals exchanged with the satellite elements for beamforming. The gateway 104 may transmit signals to the satellite 102 over the satellite return links for phase and/or gain calibration for the uplink and the downlink beams. The signals used for phase and/or gain calibration may include unique code words that identify such signals as being configured for phase and/or gain calibration. The satellite 102 may measure the phase and gain of the transmitted calibration signals to enable calibration and/or pointing correction.

In some implementations, a VHS may be co-located with the satellite gateway 104, while in other implementations a VHS may be located separately from the satellite gateway 104, but coupled to the satellite gateway 102, for example, using a dedicated network connection. The satellite 102, the satellite gateway 104 and the VHS may be managed by the satellite network provider.

The VHS may include logic embedded in a server, or a collection of servers, which is configured to perform resource allocation on board the satellite 102 based on communication service requirements that are received from the VHCs 106. In one implementation, the VHS may include a collection of software modules stored in the memory of a server computer. The software modules may include algorithms which, when executed by the server processor, provide network resource allocation functionality. Software modules may also be referred to as application modules. The software modules may include application modules that register with the VHS to provide functionality that may be requested by enterprise customers. For example, the application modules may include third party application modules developed by enterprise customers. The VHS may also include protection modules that ensure that the application modules or other software modules do not provide instructions to the satellite that would damage the satellite, violate regulations, or violate Service Level Agreements (SLAs), as described further below in FIG. 2.

Each of the VHCs 106 may be associated with individual enterprise customers of the satellite network provider. Each VHC may include logic embedded in a computer, or a collection of computers, which is configured to determine the communication service requirements of the users associated with the respective enterprise customers and, accordingly, compute the resources in the satellite communications system 100 that are needed by the enterprise customer for providing service to its users. In one implementation, the VHC may include a collection of software modules stored in the memory of a computer at an enterprise customer site. The software modules may include algorithms which, when executed by the computer processor, provide functionality for computing communication service requirements.

As shown in FIG. 1, each VHC 106 may be coupled to a satellite antenna for communicating with the satellite gateway 102 and the user terminals 108 over the satellite channels. For example, a VHC 106 may receive information on the requirements of the users associated with the corresponding enterprise customer via a communication channel formed over the satellite links 116 and 118. The VHC 106 may translate the requirements into communication service requirements for the enterprise customer and send the communication service requirements to the VHS by a communication channel formed over the satellite links 112 and 116 and through the satellite gateway 104. In some implementations, the VHC 106 may additionally or alternatively send the communication service requirements to the VHS over the terrestrial link 114.

The VHCs 106 communicate with the VHS to provision beams, frequencies, bandwidths and power levels in the satellite communications system 100 in order to utilize efficiently the resources of the satellite 102. A VHC may be constrained by the maximum number of beams that the VHS is allowed to use. The VHC also may be constrained by a limit on satellite power utilized by the user terminals of the VHC enterprise customer, e.g., a maximum amount of satellite power that can be utilized. Furthermore, the VHC may be constrained by bandwidth per beam, or a geographic region where service for the enterprise customer is allowed.

The constraints on the VHCs and minimum communication service requirements for an enterprise customer may be specified in a SLA that is made between the enterprise customer and the operator of the satellite network 100 (that is, the satellite network provider). The SLA may include values of lower and/or upper limits of one or more network parameters for the enterprise customer, which are described in a following section. In one implementation, the VHS is responsible for ensuring that each VHC stays within its SLA such that satellite resources are efficiently deployed while providing the agreed upon service levels.

In some implementations, the VHC may receive an indication from the VHS of available APIs for various functions enabled by application modules registered on the VHS, notify end-users of the functions that are available, receive requests for beams using the one or more particular functions that are available, and execute the API calls to request that the VHS generate a beam configuration using the one or more particular functions.

The VHS considers all communication service requirements, which include beam, power, bandwidth and routing requirements, in the aggregate from all VHCs. In the process, the VHS may take into consideration beam to beam interference (for example, co-polarization, cross-polarization or adjacent channel interference); satellite power resources; and other satellite constraints (for example, number of channels and beams). Then the VHS generates a common resource plan, also referred to as a unified beam plan, with unified beam, power, frequency, timing, bandwidth and routing, which is sent to the different VHCs. Once a VHC receives its beam plans, it provisions channels and beams to its associated users.

The satellite gateway 104 and the VHCs 106 may be connected through the satellite links 112 and 116, or through the terrestrial link 114, or both. In some implementations, the satellite links 112 and 116 may be configured as dedicated command/control channels for the virtual hubs. For example, 2.5 mega-hertz (MHz) of the satellite bandwidth (2.5 MHz in both the uplink and the downlink) may be dedicated to the control channel, with the control channel beams for all VHCs 106 sharing the same 2.5 MHz bandwidth. Since the satellite beams may cover a large geographical area (for example, far-flung regions of the Earth), the VHCs 106 may be widely distributed.

In some implementations, the terrestrial link 114 may provide a terrestrial option for the virtual hub command/control channel. The terrestrial link 114 may be part of a closed network accessible only to components of the satellite communications system 100, such as the satellite gateway 104/VHS and the VHCs 106. For example, the terrestrial link 114 may be a dedicated physical cable connecting the VHS to the VHCs. Alternatively, the terrestrial link 114 may be part of an open network, such as the Internet. In either case, the terrestrial link 114 may be a high-speed connection, such as an optical connection with data rates in the range of gigabits per second.

Implementations that employ the terrestrial command channel approach may limit the geographical locations of the VHCs 106, for example to areas where connectivity through physical cables is possible. At the same time, such implementations do not need satellite bandwidth for the command/control channel, which may be more cost-effective since satellite connectivity may be more expensive than terrestrial connectivity. In some implementations, a combination of satellite and terrestrial connectivity may be employed to provide the virtual hub command/control channel.

Each enterprise customer may manage its own set of users, who are represented by the user terminals 108, which are networked computing devices configured to communicate over the satellite links 118. The user terminals may be computers, cable set-top boxes, or phone booths that are coupled to satellite antennas for communicating over the satellite links 118. For example, an enterprise customer may be a chain of gas stations, with individual gas stations being the users. The user terminal for each gas station may be a desktop computer that is connected to a very small aperture terminal (VSAT) antenna. The user terminals also may be mobile devices such as handheld phones, electronic tablets, or personal digital assistants with in-built satellite antennas, or networked computers in vehicles with satellite connectivity. For example, an enterprise customer may be a commercial freight company that has a fleet of tractor-trailers and freight trains, which are equipped with laptop computers connected to satellite antennas that are affixed to the vehicles. The fleet drivers may represent the users of the freight company, which may lease bandwidth in a satellite network so that the vehicles may be connected to the company headquarters while they are on the road.

The user terminals 108 in separate satellite coverage areas may be serviced by different formed beams. The user terminals may communicate with each other and with the VHCs 106 via the satellite links 118 and 116.

The satellite communications system 100 provide flexible and dynamic beam allocation to enterprise customers in a manner described by the following illustrative example. Consider a law firm as an enterprise customer that has office locations distributed throughout North America. Each office location may have a satellite modem and VSAT antenna as the user terminal 108. The law firm has a VHC in one of its office locations. For example, the law firm may have a computer at its headquarters that runs software modules implementing VHC functionalities, which may include algorithms to determine communication service requirements based on functional needs of the different office locations.

The law firm determines the typical connectivity requirements for the various office locations such that employees may be consistently connected across the different offices. The connectivity requirement for each office may include, for example, the aggregate network bandwidth or the data rate and minimum quality of service (QoS) such that an acceptable enterprise-level network connection may be available for the particular office.

The law firm computes the overall network requirement based on the individual office connectivity requirements. For example, an operator at the firm headquarters enters the different office connectivity requirements in the computer hosting the VHC modules as the requirement for the law firm, and runs the VHC modules to determine the overall communication service requirements for the law firm.

The firm may have an agreement with a satellite network provider for leasing network resources offered by the satellite network provider. The agreement may include, among other constraints, the geographic areas where the satellite network provider will provide coverage to connect the users of the firm. For example, the geographic coverage areas in the agreement may map to the areas where the offices of the firm are located. The agreement also may include the minimum data rate provided by the satellite communication channels that will interconnect the various offices of the firm. In addition, the agreement may include a minimum radiating power for the beams such that the satellite antennas associated with the user terminals of the enterprise customer may successfully receive the transmitted signal, and, in some implementations, also may include a percentage up-time that takes into account inclement weather conditions.

If the communication service requirements for the law firm are within the values specified in the SLA for the law firm, the VHC module at the offices of the law firm conveys the communication service requirements to the VHS run by the satellite network provider. The network operator may, for example, run VHS modules on the computer at the offices of the satellite network provider to determine how resources on the satellite 102 may be allocated so that the service requirements of the law firm may be satisfied as per the agreement. The resource allocation, which is encompassed in a beam plan for the enterprise, may include, for example, shapes and locations of the beams, link bandwidths, uplink and downlink frequencies, and, optionally, a strategy for mitigating signal fades due to atmospheric conditions such as rain, which may be referred to as fade mitigation strategy.

When attempting to allocate satellite resources to satisfy the law firm's communication service need, the current resource allocation in the satellite network for existing enterprise customers also may be affected, since in a satellite network a communication link may affect one or more other communication links. Therefore, the VHS modules will have to ensure that the communication service requirements for existing enterprise customers are also being satisfied while allocating resources for the new enterprise customer (that is, the law firm). Accordingly, the VHS modules have to check that existing SLAs are being met. This may be achieved in the satellite communications system 100 because the VHS is a centralized entity that receives the communication service requirements for all the enterprise customers and, therefore, has a global view of the resource needs in the network. Additionally, the VHS may check that an allocation of satellite resources will not result in damage to the satellite, e.g., exceeding power limits of a portion of the satellite. Further, the VHS may check that regulations are satisfied by an allocation of resources, e.g., a country's laws may limit an amount of interference in certain geographic areas.

When the VHS comes up with a unified beam plan, the VHS conveys the individual portions of the unified beam plan for each enterprise customer to the VHC associated with the respective enterprise customer. In some implementations, the VHS obtains approval from all the enterprise customers before implementing the unified beam plan.

The VHS sends the unified beam plan to the satellite 102 via the satellite gateway 104 and over the command/control channel 112. The unified beam plan may include, for example, a list of all the beams, and for each beam, beam coefficients on the uplink, frequency translation, frequencies on the uplink and the downlink, the beam bandwidth and beam coefficients on the downlink, and a beam power value on the downlink. The antenna elements on the satellite 102 are configured to generate the beam patterns according to the beam coefficients in the plan. The logic on the satellite on-board processor is updated such that content received from a source user terminal on an uplink beam is switched to the corresponding downlink beam that connects the source user terminal to the intended destination user terminal.

The operator for an enterprise customer receives the new beam plan from the VHS through its VHC computer. For example, a display coupled to the VHC may show the details of the beam plan on a user interface. The operator accordingly configures the user terminals of the enterprise customer to receive the RF channels over the beams allocated to the enterprise customer. For example, the operator orients each user terminal in the direction of the beam; sets the transmission and/or reception frequency to that of the allocated RF channel; and sets the terminal transmit and/or receive power levels such that the RF transmission or reception may be successfully made. Subsequently, once the beams are activated on the satellite 102, the user terminals of the enterprise customer may communicate with one another and with other entities over the satellite network 100, while being provided with a QoS based on the agreement with the satellite network provider.

In some implementations, the VHS may update the overall unified beam plan frequently. For example, as enterprise customers join or leave the network, or the service requirements of existing enterprise customers change, the VHS updates the resource allocation by, for example, adding new resources or deleting unused resources to ensure that the agreed-upon communication service requirements of the current enterprise customers are met. The VHS may perform these updates periodically (for example, once a week, once a day, or once an hour) or substantially continually (for example, once every few seconds) at regularly predetermined time intervals or in response to the changing service needs of enterprise customers. For example, a unified beam plan may include a beam that covers a plane so that the unified beam plan is continually updated as the plane follows a flight path.

In some implementations, the VHS and VHC modules may be closely tied in their functionalities. For example, the VHC and VHS may be the client and server, respectively, in a client-server system implemented by the satellite network provider, who deploys the VHC modules at the enterprise customer sites. As described previously, the VHS and VHC modules may be linked by dedicated command/control channels, such as over the satellite links 112 and 116, and/or the terrestrial link 114.

Figure 2:
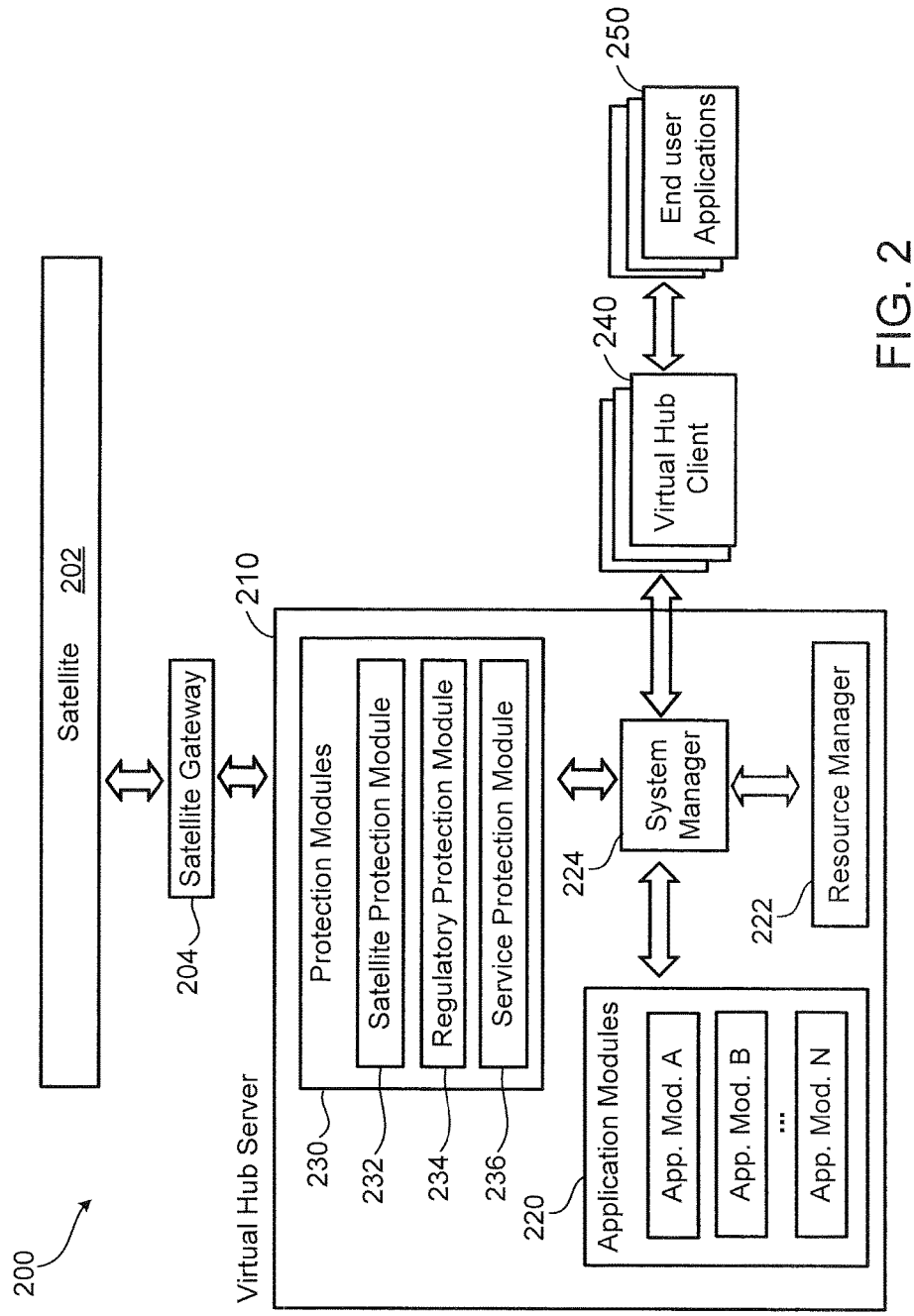
FIG. 2 illustrates a block diagram of an example satellite processing operating system.

FIG. 2 illustrates a block diagram of an example satellite processing operating system 200. The system 200 includes a satellite 202, a satellite gateway 204, a VHS 210, VHCs 240, and end-user applications 250. The satellite processing operating system 200 may be similar to the satellite communications system 100. For example, the satellite 202 may have features similar to that of the satellite 102. The satellite 202 may be configured to receive the beam coefficients from the satellite gateway 204 that are sent by the VHS 210 for the current unified beam plan. Based on the received beam coefficients, the satellite 202 combines the phase and gain of individual RF antenna elements on the satellite 202 to create downlink and uplink beams.

The VHS 210 may be implemented as server software on one or more computers at the premises of the satellite network provider. The VHS 210 may include application modules 220, a resource manager 222, protection modules 230, and a system manager 224. The application modules 220 may be one or more software that are registered with the VHS 210 to provide various functionality. For example, the application modules 220 may include ten different application modules where each application module provides functionality for beam shaping using a different type of algorithm. In another example, an application module may include functionality for rain fade mitigation, channel routing optimization, or payload optimization.

The application modules 220 may describe inputs to a function, outputs of the function, and requirements for the function. In a particular example, a beam shaping application module may describe that inputs are a geographic area, power, frequency for a particular beam, and the outputs of the function may specify a shape, power, and frequency of a particular beam, and the requirements for the function may be that the satellite is able to change an amount of power provided to feeds of the satellite. In another example, a beam shaping application module may describe geographic locations of user terminals and communication link requirements, e.g., quality of service, particular frequency, etc., for the user terminals, a beam shape and a signal strength in dB (decibels) as the one or more outputs, and capability to form a beam from multiple antennae as the one or more capabilities that the satellite must have for the function to be used. Other application modules 220 may provide functions for beams to be defined based on polygons, circles, ovals, etc. The application modules 220 may also describe API functions that may be called to use the functionality of the application modules 220.

The application modules 220 are registered with the VHS 210. For example, as further described below in relation to FIG. 3, the VHS 210 may determine that requirements for the function are satisfied and in response, register the application module 220, and notify end-user applications 250 that those API functions are available. Accordingly, registration may allow other application modules and end-user applications to know and use functions provided by application modules through the API.

Other functions provided by application modules may include query functions including a function for end-user applications to query the VHS 210 for functions that are available, capabilities of the service, SLAs, registration functions for an end-user application to register with the VHS 210 and indicate the functionality that the end-user application can utilize, channel control for defining bandwidth, power, interference, and EIRP requirements, routing support for scheduling beams, specifying beams as unidirectional or bi-directional, and specifying beams as point-to-point or point to multi-point, beam forming for generating spot beams or shaped beams, real time dynamics for beam tracking, channel routing, or scheduling, and monitoring for viewing power spectral density plots of any beam or channel, interference predictive plots, or other reports.

The resource manager 222 may receive communication service requirements from the VHCs that are deployed at the sites of the enterprise customers of the satellite network provider. Based on the communication service requirements, the resource manager 222 generates a unified beam plan for the overall network. The resource managers 222 may optimize the coefficient tables for the beams and generate pointing correction tables as part of computing the unified beam plan for the network. In some implementations, the unified beam plan generated by the resource manager 222 may be further based on SLAs in addition to the communication service requirements and inputs from the application modules 220. The resource manager 222 takes into consideration the requirements of all the enterprise customers as set forth in the SLAs to ensure that the optimal beam/spectrum plans satisfy the requirements of the enterprise customers as stipulated in their respective agreements with the satellite network provider. The agreement may restrict parameters such as the bandwidth, spectra, power and geographic coverage provided to the users of the enterprise customer, which may be referred to as constraints. The SLAs also may indicate the priority that will be given to competing service requests from the enterprise customers. The resource manager 222 may further utilize the application modules 220 in generating the unified beam plan. For example, the resource manager 222 may determine that a particular beam is to be generated using a function provided by a particular application module and, in response, determine a unified beam plan that results in beams that include the particular beam generated using the function provided by the particular application.

The protection modules 230 may be modules that ensure any unified beam plan that the VHS 210 provides the satellite 202 would not result in damage to the satellite, violation of any regulations or rules set of various governmental entities or other communication providers, or violations of customer SLAs. Accordingly, the protection modules 230 may be a final safety measure that determines whether any unified beam plan generated by the resource manager 222 should actually be used. A unified beam plan may need to pass all protection modules 230 before being used. Each protection module may use a sandbox simulator to determine what the unified beam plan passes the protection module or fails the protection module. For example, the sandbox simulator may simulate a satellite using the unified beam plan with various possible signal inputs. In some implementations, if the protection modules 230 determine that a unified beam plan fails to satisfy the protection modules 230, the protection modules 230 may generate an alert for a system administrator and may indicate a source of the fault. For example, if the protection module 230 determines that a source of a fault is from a third party application module, then the protection module 230 may provide an alert that use of the third party application module resulted in a plan that would have damaged the satellite and that the third party application should be disabled or corrected.

In some implementations, the use of protection modules may enable the resource manager 222 to disregard some requirements when generating a unified beam plan to increase computational efficiency. For example, when a request for a new beam over New York City in a particular frequency is received, the resource manager 222 may determine that no other beam near that frequency is over New York City so, in response, simply add a new beam to the unified beam plan without checking whether other requirements are still satisfied. However, in some cases, the new beam may not interfere with existing beams but may still result in power through a component of the satellite that may damage the satellite and the protection modules 230 may identify that problem. In some implementations, protection modules 230 may be only modified by a limited number of people, e.g., a system administrator, so may be more trustworthy than third party application modules added or modified by many people The protection modules 230 may include a satellite protection module 232, a regulatory protection module 234, and a service protection module 236. The satellite protection module 232 may ensure that a unified beam plan does not result in damage to a satellite. For example, the satellite protection module 232 may determine that the unified beam plan does not result in providing power to a feed element of the satellite that would exceed a maximum power that the feed element can safely tolerate or result in a Multi Power Amplifier (MPA) drive level that would exceed safe power limits of the MPA. The satellite protection module 232 may use a rules database that may be defined by a script language or a set of rules that define all possible satellite constraints. For example, rules may include that MPA drive level shall be less than y decibel watt (dBW). In some implementations, the rules database may only be modified by an authorized user to ensure that the satellite protection module 232 always functions correctly. The scripting interface for the satellite protection module 232 may also allow for custom rules enabling future extensibility.

The regulatory protection module 234 may determine if any regulatory constraints are violated by a unified beam plan. The regulatory protection module 234 may use a database of regulatory constraints. Example constraints including frequency dependent power flux density (PFD) limits, non-geostationary satellite orbit (NGSO) avoidance rules, coordination with terrestrial services, and custom rules. In some implementations, the regulatory protection module 234 may measure or estimate regulatory compliance based on in-operation measurements and allow an operator to understand headroom against regulatory constraints in an operational system.

The service protection module 236 may determine if any customer SLA is violated. The service protection module 236 may access a data base of customers and services where each customer/service may have a SLA. In some implementations, the SLA may be defined using a script language. In other implementations, the SLA may be defined using a particular data structure with fields representing various possible SLA constraints. SLAs may include C/I, QOS during rain, QOS clear sky, bandwidths, C/I. Simulations of all beams and channels may be performed to determine SLA compliance. Any failures may be flagged, logged and reported to the system administrator.

The system manager 224 may manage the VHS 210 to ensure that application modules 220 are registered, API calls for the application modules 220 are forwarded, end-user applications 250 are registered, sufficient information for generating unified beam plans is provided to the resource manager 222, the protection modules 230 determine whether the beam plans from the resource manager 222 pass or fail, and requests from VHCs 240 and end-user applications 250 are correctly handled. Further details of processing by the system manager 224 is described, for example, for FIG. 7.

Once the unified beam plan is successfully generated by the resource manager 222 and passes the protection modules 230, the VHS 300 communicates the individual portions of the plan to the VHC at each enterprise customer corresponding to the individual portion and sends the beam coefficients to the satellite through the satellite gateway 204. For example, the system manager 224 may provide the unified beam plan to the satellite gateway 204 to upload to the satellite 202 and provide corresponding coefficients for user terminals 108.

Figure 3:
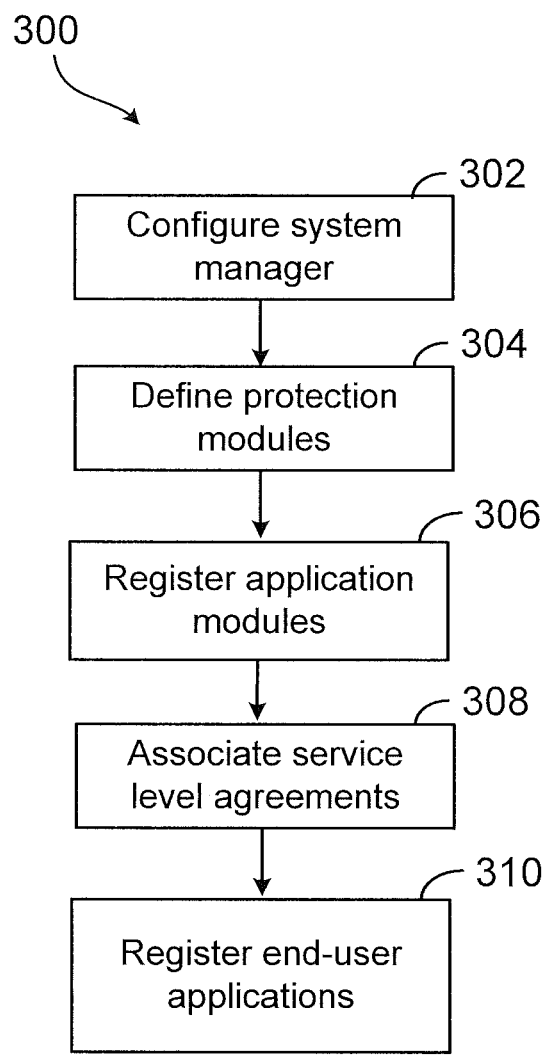
FIG. 3 illustrates an example process performed by a satellite processing operating system for setting up the satellite processing operating system.

FIG. 3 illustrates an example process 300 performed by a satellite processing operating system for setting up the satellite processing operating system. The process 300 may be performed by a VHS 210. Accordingly, the following sections describe the process 300 in the context of the satellite processing operating system 200. However, the process 300 also may be performed by other devices in other networks or systems.

Initially, the system manager 224 is configured (302). During configuration, a system administrator may input characteristics of a satellite and the capabilities of the satellite used in the satellite processing operating system 200. For example, a system administrator may input that the satellite is capable of modifying an amount of power provided through individual feed elements and input a maximum amount of power that may be provided by an individual feed element. In another example, the system manager 224 may provide a query to the satellite 202 for capabilities of the satellite 202 and receive a response from the satellite 202 that describes those capabilities. Capabilities may be specific to particular geographic areas. For example, a satellite may provide beamforming in the Northern hemisphere but not in the Southern hemisphere.

In the process 300, the protection modules are defined (304). For example, as described above, a system administrator or operator may define rules for the satellite protection module, regulatory protection module 236, and service protection module 218 using a scripting language. In another example, the system manager 224 may automatically generate or select appropriate rules based on capabilities of a satellite, or regulations and agreements regarding satellite coverage.

In the process 300, application modules are registered (306). For example, as described above, the system manager 224 may receive registration requests from application modules 220, determine whether capabilities of the satellite 202 satisfy requirements of the application modules 220, and for those application modules 220 that have requirements that are satisfied, register the application modules 220 so that functionality of the registered application modules 220 may be used through API calls. Further details of the registration is described below for FIG. 7.

In the process 300, SLAs are associated with VHCs 240 (308). For example, SLAs may define limits, either minimum or maximum or both, on the resources of the satellite processing operating system 200 that the satellite network provider will provide to the enterprise customer. As such, the SLA limits the range of communication service requirements that will be deemed acceptable by the satellite system 200 for purposes of allocating resources to the enterprise customer in response to a communications service request from the enterprise customer. The SLA agreement may be established before a beam plan is designed or deployed for the VHC 206.

One of the constraints in the agreement may be the amount of clear sky power that will be provided to a user of the enterprise customer. The SLA may specify that the satellite network provider will provide X dBW of EIRP (X being a non-negative number) in the beams that connect users of the enterprise customer during normal operating conditions. For example, the clear sky power in the SLA may be 50 dBW of EIRP. The enterprise customer may determine the clear sky power based on the nominal (that is, during normal operating conditions) power requirement of its user terminals.

Another parameter that may be included in the SLA is the interference power, which may be specified as C/I, that is, the ratio of the power in the beams provided to the enterprise customer ("C") to the interference power due to the beams of other customers ("I") of the satellite network provider. For example, the agreement may specify a 10 dB C/I, which means that the satellite network provider will ensure that the interference power from all other sources is $1/10^{th}$ of the power in the beams allocated to the enterprise customer.

When designing a beam plan for the enterprise customer, the interference power may be used to determine the maximum data rate over a fixed beam bandwidth that may be provided to the users of the enterprise customer. More satellite resources may be needed to achieve a lower interference power, and therefore the satellite network provider may charge the enterprise customer more to guarantee lower interference power.

A third parameter in the SLA may be extra power during rain. This is additional power that is provided to the beams allocated to the enterprise customer during rainy conditions to counter the effects of signal fading due to the rain. For example, the agreement might say that when it is raining, the satellite network provider will add 6 dBW of extra power to the 50 dBW clear sky power mentioned in the agreement.

In some implementations, the extra power during rain may be specified it in terms QoS, and not as EIRP. The QoS may be specified in terms of network availability. For example, the agreement may state that satellite communications system will guarantee network availability to the users (that is, a certain power level to the user terminals) of the enterprise customer 99% of the time. The VHS at the satellite network provider can convert the QoS metric to effective power for the beams allocated to the enterprise customer during rain fade situations.

Another parameter that may be included in the SLA is the bandwidth allocated to the users. The bandwidth that may be indicated in the agreement is the bandwidth of the beams allocated by the satellite network provider. The satellite network provider may provide bandwidth to the enterprise customer in increments of 2.5 MHz.

The geographic coverage requirements of the enterprise customer also may be included in the SLA. For example, the agreement may specify the locations of the user terminals of the enterprise customer, which determine the areas that are to be covered by the beams allocated to the enterprise customer. Greater coverage areas may be covered by larger beams, which require more resources on the satellite, and therefore, may be more expensive for the enterprise customer.

The beams that are designed based on the geographic coverage requirements may be spot beams, which are approximately circular or elliptical beams covering small areas, or they may be shapes. For example, the geographic area specified by the enterprise customer may be a polygonal shape, which can be covered by a polygonal beam.

A sixth parameter that may be included in the SLA is switching. The enterprise customer may specify how the user terminals in its coverage areas should be connected, which determines how an uplink beam should be connected to a downlink beam by the switching fabric on the satellite to provide the desired connectivity. For example, the enterprise customer may specify that its office in Washington D.C. should be connected to its office in Silicon Valley. This implies that a beam that covers the Washington D.C. office should be connected on board the satellite to a beam that covers the Silicon Valley office so that an end-to-end connection can be established.

It is to be noted that in some implementations, the SLA may be optional. In such implementations, some enterprise customers may not establish a SLA with satellite network provider. When the VHC associated with such an enterprise customer sends a request to the VHS for satellite resources, the VHS does not check the communication service requirements for the enterprise customer, which is sent with the request, against a SLA. Instead, the VHS determines whether spare resources (that is, beams) are available that may be allocated to satisfy the communication service requirements of the enterprise customer without affecting the services that are being provided to existing enterprise customers.

The process 300 includes end-user application registration (306). For example, the system manager 224 may receive requests from end-user applications 250 to register with the VHS 210. The end-user applications 250 may be third party software that may utilize APIs provided by the system manager 224. In the end-user application registration process, the end-user application 250 may indicate the capabilities of the end-user application 250 provides so that the system manager 224 may tailor information provided to the end-user application 250 to information that the end-user application 250 is capable of handling. End-user applications may have information useful to the satellite processing operating system 200 such as live quality of service telemetry of all the users connected to the application. In this example, the satellite processing operating system 200 can use the information to determine if satellite power over these users needs to be increased. From a top level it allows the satellite processing operating system 200 to know what applications it has talking to it and what information can be pulled from that application or pushed to that application. A push example is an application that can read the spectrum plot of the channel measured on the satellite so the satellite processing operating system 200 periodically sends that information to the application.

Figure 4:
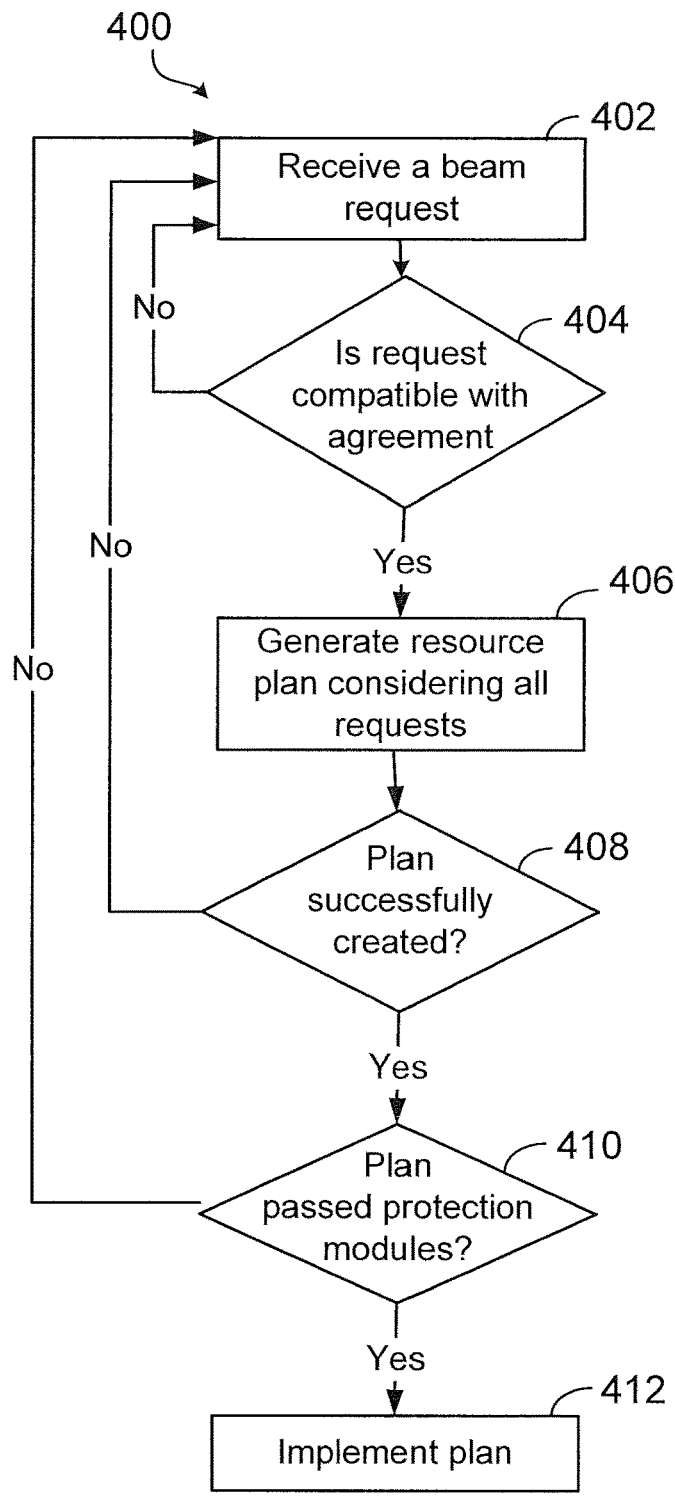
FIG. 4 illustrates an example process performed by a satellite processing operating system for handling a request for a beam.

FIG. 4 illustrates an example process 400 performed by a satellite processing operating system for handling a request. The process 400 may be performed by a VHS 210. Accordingly, the following sections describe the process 400 in the context of the satellite processing operating system 200. However, the process 400 also may be performed by other devices in other networks or systems.

Initially, the process 400 includes receiving a beam request (402). For example, a VHC for an end-user application may receive a request for a new beam, where the request specifies geographic locations of user terminals and communication link requirements, through a VHC of the end-user application.

The VHC 240 determines whether the request is compatible with a SLA for the enterprise customer (404). For example, the VHC 240 determines whether the new beam would exceed the maximum service specified by the SLA for the enterprise customer. If the request is not compatible with the SLA, the VHC 240 may provide an indication to the end-user application 250 that the request is not compatible with the SLA, provide instructions for the enterprise customer to request for additional services or modify other requests for the enterprise customer to free up resources for the current request, or end the process 400.

If the request is compatible with the agreement, the VHC 240 may provide the request to the VHS 210 for the VHS 210 to generate a resource plan considering all requests (406). For example, the system manager 224 may receive a request from the VHC 240 and provide the request along with other requests to the resource manager 222 to generate a unified beam plan. In some implementations, the resource manager 222 may identify API calls to particular functions provided by application modules 220 and provide the relevant inputs to the application modules and receive the outputs, e.g., defined beams, and then use the outputs to generate the unified beam plan. In other implementations, the system manager 224 may provide the requests to the application modules 220 to define beams corresponding to individual requests and the beams defined by the application modules 220 may then be provided to the resource manager 222 for the resource manager 222 to determine whether a unified beam plan can provide all the beams defined by the functions for the individual requests.

The system manager 224 may determine whether a unified beam plan that satisfies the requests was successfully created by the resource manager 222 (408). For example, the resource manager 222 may determine that all the requests may not be satisfied and, in response, generate an error indicating what requests could not be satisfied and an explanation as to why the requests could not be satisfied. In response, the system manager 224 may end the process 400 and provide an indication to the end-user application that the request could not be fulfilled given existing other requests.

When the plan is successfully created by the resource manager 222, the system manager 224 may then provide the plan to the protection modules 230 (410). If any of the protection modules 230 determine that the plan does not satisfy the protection module, an error generated, an indication provided to a system administrator, and the process 400 stopped. If the unified beam plan does pass all the protection modules 230, the VHS 210 may provide the unified beam plan to the satellite gateway 204 to implement on the satellite 202 and also have other terrestrial components be adjusted as needed based on the updated unified beam plan.

Figure 5:
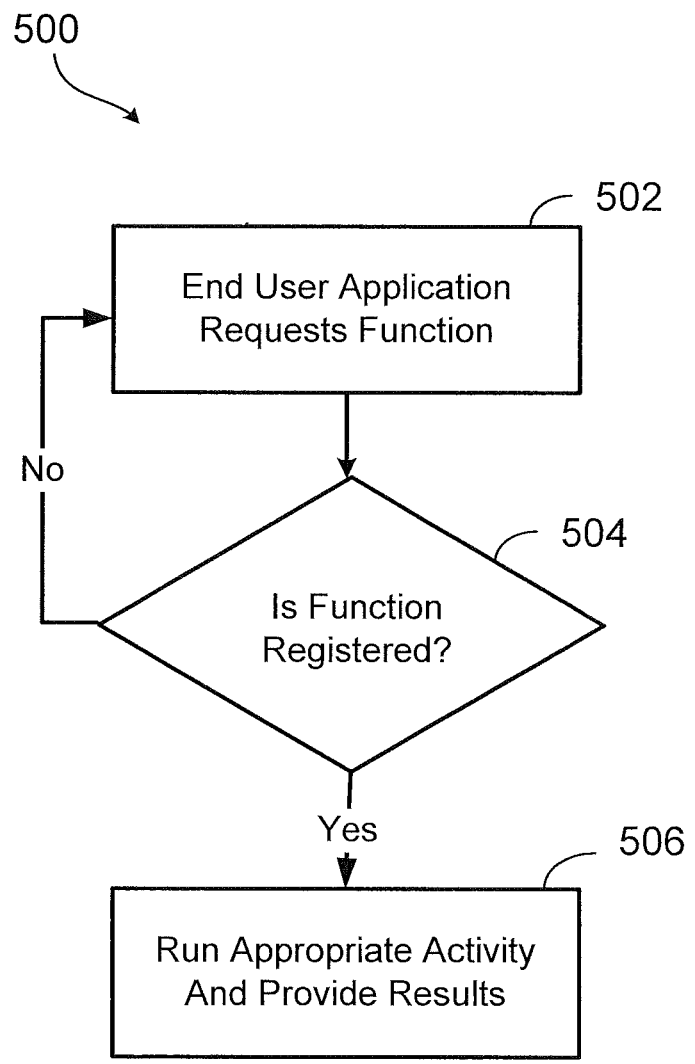
FIG. 5 illustrates an example process performed by a satellite processing operating system for handling a request for a function.

FIG. 5 illustrates an example process 500 performed by a satellite processing operating system for handling a request for a function. The process 500 may be performed in the context of the satellite processing operating system 200. However, the process 500 also may be performed by other devices in other networks or systems. Initially, an end-user application may request a function (502). For example, the end-user application may request that a beam be generated that tracks a flightpath of a plane where the request is in the form of an API call to a function provided by an application module for providing beams following flightpaths.

The system manager 224 may receive the request and determine whether the function requested by the end-user application is registered (504). For example, the system manager 224 may receive the API call and determine whether the API call corresponds to any function registered with the system manager 224. If the system manager 224 determines the function is not registered, the system manager 224 may provide an indication to the end-user application that no such function is registered and may suggest that the enterprise customer notify a system administrator that the function is desired.

If the system manager 224 determines that the functionality is registered, the system manager 224 may handle the request using the function (506). For example, the system manager 224 may forward the API call to the corresponding application module and have the resource manager 222 attempt to generate an updated unified beam plan using the corresponding application module.

Figure 6:
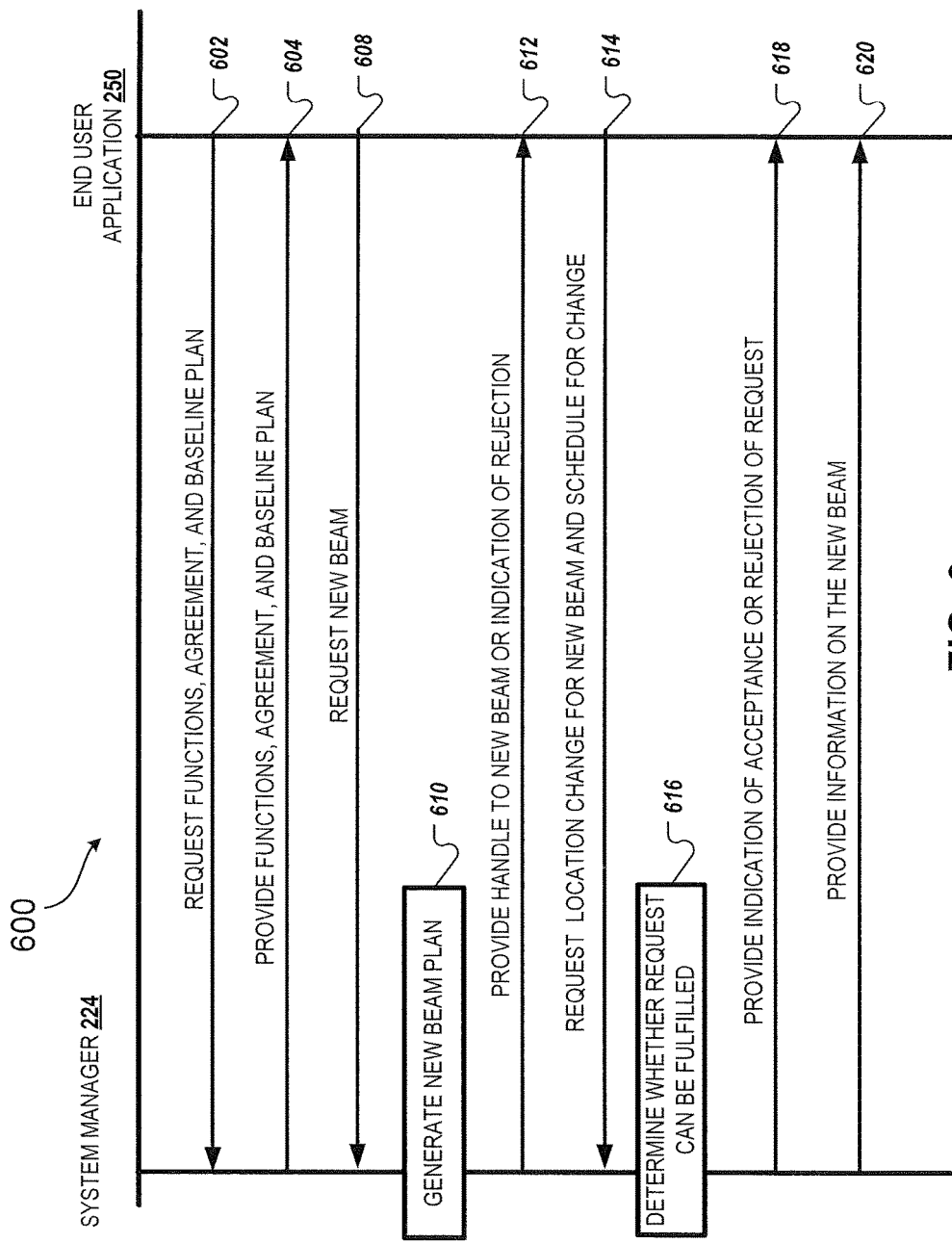
FIG. 6 illustrates an example interaction diagram of a satellite processing operating system and end-user application handling a request.

FIG. 6 illustrates an example interaction diagram 600 of a satellite processing operating system and end-user application handling a request. The diagram 600 may illustrate interactions in the context of the satellite processing operating system 200. However, the diagram 600 may illustrate interactions for other devices in other networks or systems. Initially, the end-user application may provide requests to the system manager 224 that query for functions registered with the system manager 224, SLAs associated with an enterprise customer corresponding to the end-user application, and a baseline beam plan (602). The request may be provided using APIs provided by standard default application modules on the VHS 210 that provide for query functionality.

The system manager 224 may receive the query, and in response, provide information to the end-user application 250 that indicate the functions, SLA, and baseline beam plan (604). For example, the system manager 242 may indicate that functions for ten different beam shaping algorithms are registered with the system manager 242 and describe the API to use the functions, describe parameters of the SLA, and provide information describing beams corresponding to the enterprise customer of the end-user application 250.

The end-user application 250 may receive the functions, SLA, and baseline plan and, in response, provide a request for a new beam (608). For example, the end-user application 250 may determine that the ten different beam shaping algorithms are available, e.g., algorithms that take into account amplifier balancing, maximize signal to noise ratio, maximize gain while meeting a C/I constraint, shape a beam to cover an shaped region, maximize beam performance across a set of beams rather than an individual beam, etc., and display a graphical user interface to an end-user showing the current beams for the enterprise customer based on the baseline plan, controls for the end user to select to generate new beam plan using a particular beam shaping algorithm, and controls for the end user to input characteristics of the beam, e.g., power, geographic area, frequency, etc. The end-user application 25 will receive the user inputs and in response generate a request corresponding to the input and provide the request to the system manager 224.

The system manager 224 may generate a new beam plan (610). For example, as described above, the system manager 224 may provide multiple requests to the resource manager 222 for the resource manager 222 to use the application modules 220 to generate a new unified beam plan, or the system manager 224 may provide the requests to the application modules 220 and then provide the outputs of the application modules 220 to the resource manager 222 to generate a new unified beam plan, and then determine whether the new unified beam plan passes the protection modules 230.

The system manager 224 provides a handle to the new beam or an indication of rejection of the request (612). For example, the system manager 224 may either provide the end-user application a unique identifier for the new beam so that the end-user application 250 may then use the unique identifier when providing future instructions to the system manager 224. In another example, where the system manager 224 determines that the resource manager 222 is unable to generate a unified beam plan that fulfills all requests and passes the protection modules 230, the system manager 224 may provide an indication that the request is rejected.

Where the end-user application 250 receives a handle to the new beam, the end-user application 250 requests a location change for a new beam and a schedule for the change (614). For example, the end-user application 250 may request that for the beam specified by the handle the beam be moved along a flightpath of a plane.

The system manager 224 determines whether the request can be fulfilled (616). For example, the system manager 224 may provide the request to the resource manager 222 along with all the other active requests for the resource manager 222 to use the appropriate functions provided by the application modules 220 to generate a unified beam plan and then the system manager 224 may determine whether the unified beam plan passes the protection modules 230.

The system manager 224 provides the end-user application 250 an indication of acceptance or rejection of the request (618). For example, if the system manager 224 determines that the request can be fulfilled, the system manager 224 provides an indication of acceptance to the VHC or end-user application. If the system manager 224 determines that the request can not be fulfilled, the system manager 224 provides an indication or rejection.

The system manager 224 provides information on the new beam to the end-user application 250 (620). For example, the system manager 224 may provide the end-user application information on a location, frequency, and power for the new beam according to a schedule requested by the end-user application 250.

Figure 7:
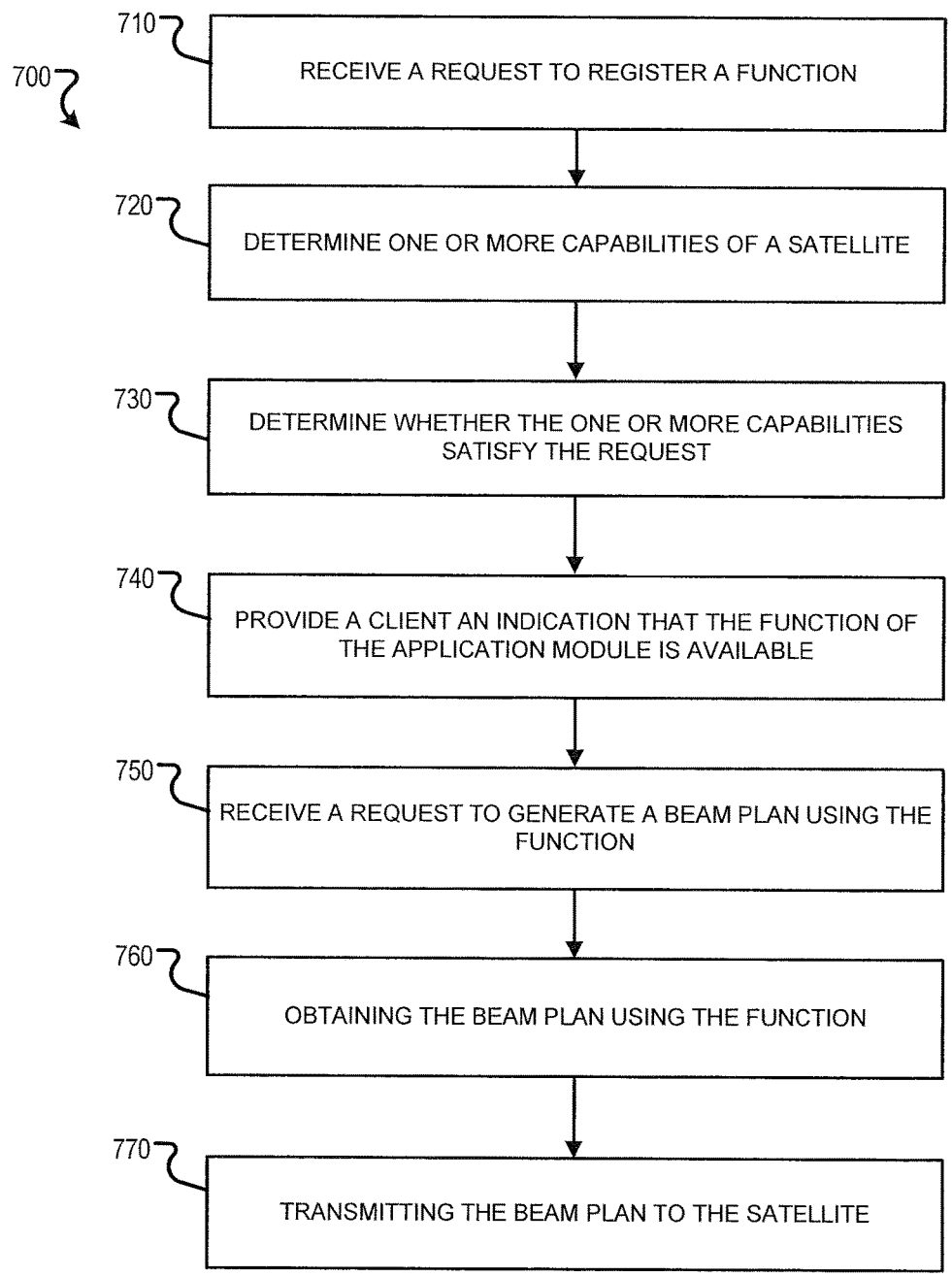
FIG. 7 illustrates an example process performed by a satellite processing operating system for registering a function and handling a request with the function.

FIG. 7 illustrates an example process 700 performed by a satellite processing operating system. The process 700 may be performed in the context of the satellite processing operating system 200. However, the process 700 also may be performed by other devices in other networks or systems. Initially, a request to register a function is received (710). For example, the system manager 224 may receive a request from the application module. The request may describe one or more inputs to a function, outputs of the function, and requirements for the function. For example, a beam shaping application module may describe that inputs are a geographic area, power, frequency for a particular beam, and available satellite feeds, and the outputs of the function may specify particular an amount of power for each feed to result in the particular beam, and the requirements for the function may be that the satellite is able to change an amount of power provided by feeds of the satellite.

In response, the system manager 224 determines one or more capabilities of the satellite 202 (720). For example, the system manager 224 may determine that the satellite is capable of changing an amount of power provided to each feed of the satellite and is capable of providing a specific maximum amount of power per feed. In determining the capabilities, the system manager 224 may access information about capabilities of the satellite stored by the system manager 224 when the system manager 224 was initially configured. As described above, the information may be received from a previously stored user input specifying capabilities of the satellite 202 or in a previously stored response from the satellite 202 to a query to the satellite 202 for capabilities of the satellite 202. In another example, the system manager 224 may query the satellite 202 for capabilities of the satellite 202 in response to requests to register a function.

The system manager 224 determines whether the one or more capabilities of the satellite 202 satisfy the request (730). For example, the system manager 224 may determine that the requirement that a satellite is able to change an amount of power provided by feeds of the satellite is satisfied when a satellite is determined to have the capability to change an amount of power provided by feeds. In another example, the system manager 224 may determine that a requirement that a satellite is able to change an amount of power provided by feeds of the satellite is not satisfied where a satellite is determined not to have the capability to change an amount of power provided by feeds. If the system manager 224 determines that the requirements for an application module are not satisfied, the system manager 224 may deny the request and provide a system administrator an indication of a reason for the denial. For example, the system manager 224 may cause a graphical user interface to appear on a display of a device used by the system administrator where the GUI includes an alert that "Application module can not be registered because the requirement of a satellite with the capability to change an amount of power provided by feeds is not satisfied."

Where the determination that the capabilities of the satellite satisfy the request, the system manager 224 provides a client an indication that the function of the application module is available (740). For example, the system manager 224 may provide the VHCs 240 an indication that the function for beam shaping is available and indicate the inputs and outputs of the function. The VHCs 240 may receive the indication and provide corresponding indicates to the end-user applications 250 so that users of the enterprise customer may provide requests that utilize the function. Client in the context of the process 700 may refer to the VHC 240, the end user applications 250, or both.

The system manager 224 receives a request to generate a beam plan using the function (750). For example, the end-user application may indicate to an enterprise customer user that beams may be generated using the beam shaping algorithm provided by the function corresponding to the registered application module, and in response, receive input from the user indicating to generate a new beam over Los Angeles using the beam shaping algorithm. The end-user application may then provide a request to generate the new beam for the enterprise customer over Los Angeles using the beam shaping algorithm and the system manager 224 may receive the request.

The system manager 224 obtains a unified beam plan using the function (760). For example, the system manager 224 may provide all the active requests to the resource manager 222 and in response receive a unified beam plan based on the function provided by the application module corresponding to the beam shaping algorithm, along with any other functions requested for other requests, and provide the unified beam plan to the protection modules 230 to determine whether the unified beam plan passes the protection modules 230. If no unified beam plan passes the protection modules 230, the system manager 224 may provide an indication to the client that the request is denied. For example, the system manager 224 may provide the VHC or end-user application an indication that the request could not be fulfilled.

If the system manager 224 determines that a unified beam plan does pass the protection modules 230, the system manager 224 provides the unified beam plan to the satellite 202 (770). For example, the system manager 224 may transmit the unified beam plan to the satellite using one or more antenna that provide signals that can be detected by one or more antenna on the satellite. In some implementations, the system manager 224 may provide the satellite 202 the unified beam plan in the form of a data structure (for example, a matrix or a table) that includes entries for all the communication paths through the satellite. For example, the unified beam plan may include information that would enable the satellite to generate all the uplink beams and the downlink beams. For each uplink beam, the corresponding entry in the data structure of the unified beam plan may specify, for example, an identifier of the uplink beam (for example, transmit beam 45), the beam coefficients for configuring the antenna elements to generate the uplink beam, the central frequency for the uplink beam and the bandwidth of the beam. For each downlink beam, the corresponding entry in the data structure of the unified beam plan specifies the identifier of the downlink beam, the beam coefficients for configuring the antenna elements to generate the downlink beam, the central frequency and the bandwidth of the downlink beam, and the power level for the downlink beam.

In addition, the unified beam plan also includes information on switching between the beams, that is, which uplink beam will be connected to which downlink beam by the switching fabric on the satellite.

Implementations of the above techniques include one or more methods, computer program products and system. A computer program product is suitably embodied in a non-transitory machine-readable medium and includes instructions executable by one or more processors. The instructions are configured to cause the one or more processors to perform the above described actions.

A system includes one or more processors and instructions embedded in a non-transitory machine-readable medium that are executable by the one or more processors. The instructions, when executed, are configured to cause the one or more processors to perform the above described actions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (for example, magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (for example, a CRT (cathode ray tube) or LCD (liquid crystal display) monitor) for displaying information to the user and a keyboard and a pointing device (for example, a mouse or a trackball) by which the user can provide input to the computer. Other kinds of devices can be used to provide for interaction with a user as well; for example, feedback provided to the user can be any form of sensory feedback (for example, visual feedback, auditory feedback, or tactile feedback); and input from the user can be received in any form, including acoustic, speech, or tactile input.

The systems and techniques described here can be implemented in a computing system that includes a back end component (for example, as a data server), or that includes a middleware component (for example, an application server), or that includes a front end component (for example, a client computer having a graphical user interface or a Web browser through which a user can interact with an implementation of the systems and techniques described here), or any combination of such back end, middleware, or front end components. The components of the system can be interconnected by any form or medium of digital data communication (for example, a communication network). Examples of communication networks include a local area network ("LAN"), a wide area network ("WAN"), a satellite network and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method performed by a satellite communications system, the method comprising:

receiving, by a system manager at a virtual hub server and from an application module that includes software algorithms that implement a software function, a request to register the software function of the application module with the system manager, wherein registering the software function of the application module with the system manager enables software algorithms in the application module to be later called upon to generate a beam plan and wherein the request describes one or more inputs to the software function, one or more outputs of the software function that are used to generate a beam plan for a satellite, and one or more capabilities that the satellite must have for the software function to be used;

in response to receiving the request to register the software function of the application with the system manager, determining, by the system manager at the virtual hub server, one or more capabilities of the satellite;

determining, by the system manager at the virtual hub server, whether the determined one or more capabilities of the satellite satisfy the described one or more capabilities that the satellite must have for the software function that the software algorithms of the application module implement to be used with the satellite;

in response to determining that the determined one or more capabilities of the satellite satisfy the described one or more capabilities that the satellite must have for the software function that the software algorithms of the application module implement to be used with the satellite, (i) providing, by the system manager at the virtual hub server, to a client an indication that the software function of the application is available to be used with the satellite and a description of the one or more inputs to the software function and (ii) registering, by the system manager at the virtual hub server, the software function of the application module as available for use with the satellite where the registration of the software function enables the software algorithms included in the application module to be later called upon by the client to generate the beam plan;

receiving, by the system manager at the virtual hub server, a request from the client to generate the beam plan for the satellite that where the request both (i) indicates that the software function that was indicated to the client as available to be used with the satellite is to be used in the generation of the beam plan and (ii) indicates values for the one or more inputs to the software function;

in response to receiving the request from the client to generate the beam plan for the satellite using the software function that was indicated to the client as available to be used with the satellite, determining by the system manager at the virtual hub server, that the software function of the application module is registered as available for use with the satellite;

in response to determining that the software function of the application module is registered as available for use with the satellite, obtaining, by the system manager at the virtual hub server, the beam plan for the satellite using the one or more outputs of the software function in response to providing to the software function the values for the one or more inputs to the software function indicated in the request from the client to generate the beam plan; and transmitting, by the system manager at the virtual hub server, the beam plan to the satellite.

2. The method of claim 1, wherein the application module comprises a beam shaping application module, the request describes a geographic location of terminals and communication link requirements as the one or more inputs, the request describes a beam as the one or more outputs, and the request describes beamforming capability as the one or more capabilities that the satellite must have for the function to be used.

3. The method of claim 1, wherein determining one or more capabilities of the satellite comprises:

in response to receiving the request to register the software function of the application module with the system manager, providing a request to the satellite for information describing one or more capabilities of the satellite; and receiving, from the satellite, information describing the one or more capabilities of the satellite.

4. The method of claim 1, wherein determining one or more capabilities of the satellite comprises accessing previously stored information that describes one or more capabilities of the satellite.

5. The method of claim 1, wherein obtaining the beam plan for the satellite using the one or more outputs of the software function comprises:
providing, by the system manager, the one or more outputs of the software function to a resource manager; and
receiving, from the resource manager, the beam plan.

6. The method of claim 1, wherein the beam plan describes all beams to be generated by the satellite.

7. The method of claim 1, wherein the request describes an application programming interface (API) through which the software algorithms in the application module are called upon by the client.

8. The method of claim 7, wherein providing to a client an indication that the software function of the application is available comprises:
providing information describing the application programming interface (API) through which the software algorithms in the application module are called upon by the client.

9. The method of claim 1, wherein the client comprises a virtual hub client that communicates with one or more end-user software applications.

10. The method of claim 9, wherein the virtual hub client is configured to:
receive a query from the end-user software application for software functions that are available;
provide information to the end-user software application describing that the software function is available;
receive a request from the end-user software application to generate the beam plan for the satellite using the software function that was indicated to the client as available; and
provide to the system manager the request to generate the beam plan for the satellite using the software function that was indicated to the client as available.

11. The method of claim 1, wherein communications between the application module and the system manager are through an application programming interface (API) of the system manager.

12. The method of claim 1, wherein determining whether the determined one or more capabilities of the satellite satisfy the described one or more capabilities that the satellite must have for the software function to be used comprises:
determining that the determined one or more capabilities of the satellite satisfy the described one or more capabilities that the satellite must have for the function to be used over one particular geographic area but not over another geographic area,
wherein the indication that the function of the application is available indicates that the function provided by the application module is available over the one particular geographic area but not over the other geographic area.

13. The method of claim 1, comprising:
determining, using a protection module, whether the beam plan satisfies one or more protection rules,
wherein transmitting the beam plan to the satellite is in response to determining that the beam plan satisfies the one or more protection rules using the protection module.

14. The method of claim 1, wherein in response to determining that the software function of the application module is registered as available for use with the satellite, obtaining the beam plan for the satellite using the one or more outputs of the software function comprises:
obtaining the beam plan for the satellite using the one or more outputs of the software function without further input from a human after receiving the request from the client to generate the beam plan for the satellite using the software function that was indicated to the client as available.

15. The method of claim 1, wherein transmitting the beam plan to the satellite comprises:
transmitting the beam plan to the satellite using an antenna.

16. The method of claim 1, wherein the system manager registers the application module and other application modules, wherein each of the application modules provide a different software function for beam shaping using a different type of algorithm, where one or more of the different software functions are used to fulfill a request, that is received later after registration of the one or more different software functions, from the client to generate the beam plan.

17. A system comprising:
one or more computers and one or more storage devices storing instructions that are operable, when executed by the one or more computers, to cause the one or more computers to perform operations comprising:
receiving, by a system manager at a virtual hub server and from an application module that includes software algorithms that implement a software function, a request to register the software function of the application module with the system manager, wherein registering the software function of the application module with the system manager enables software algorithms in the application module to be later called upon to generate a beam plan and wherein the request describes one or more inputs to the software function, one or more outputs of the software function that are used to generate a beam plan for a satellite, and one or more capabilities that the satellite must have for the software function to be used;
in response to receiving the request to register the software function of the application with the system manager, determining, by the system manager at the virtual hub server, one or more capabilities of the satellite;
determining, by the system manager at the virtual hub server, whether the determined one or more capabilities of the satellite satisfy the described one or more capabilities that the satellite must have for the software function that the software algorithms of the application module implement to be used with the satellite;
in response to determining that the determined one or more capabilities of the satellite satisfy the described one or more capabilities that the satellite must have for the software function that the software algorithms of the application module implement to be used with the satellite, (i) providing, by the system manager at the virtual hub server, to a client an indication that the software function of the application is available to be used with the satellite and a description of the one or more inputs to the software function and (ii) registering, by the system manager at the virtual hub server, the software function of the application module as available for use with the satellite where the registration of the software function enables the software algorithms included in the application module to be later called upon by the client to generate the beam plan;

receiving, by the system manager at the virtual hub server, a request from the client to generate the beam plan for the satellite that where the request both (i) indicates that the software function that was indicated to the client as available to be used with the satellite is to be used in the generation of the beam plan and (ii) indicates values for the one or more inputs to the software function;

in response to receiving the request from the client to generate the beam plan for the satellite using the software function that was indicated to the client as available to be used with the satellite, determining by the system manager at the virtual hub server, that the software function of the application module is registered as available for use with the satellite;

in response to determining that the software function of the application module is registered as available for use with the satellite, obtaining, by the system manager at the virtual hub server, the beam plan for the satellite using the one or more outputs of the software function in response to providing to the software function the values for the one or more inputs to the software function indicated in the request from the client to generate the beam plan; and transmitting, by the system manager at the virtual hub server, the beam plan to the satellite.

18. The system of claim 17, wherein the application module comprises a beam shaping application module, the request describes a geographic location of terminals and communication link requirements as the one or more inputs, the request describes a beam as the one or more outputs, and the request describes beamforming capability as the one or more capabilities that the satellite must have for the function to be used.

19. The system of claim 17, wherein determining one or more capabilities of the satellite comprises:

in response to receiving the request to register the software function of the application module with the system manager, providing a request to the satellite for information describing one or more capabilities of the satellite; and receiving, from the satellite, information describing the one or more capabilities of the satellite.

20. A non-transitory computer-readable medium storing software comprising instructions executable by one or more computers which, upon such execution, cause the one or more computers to perform operations comprising:

receiving, by a system manager at a virtual hub server and from an application module that includes software algorithms that implement a software function, a request to register the software function of the application module with the system manager, wherein registering the software function of the application module with the system manager enables software algorithms in the application module to be later called upon to generate a beam plan and wherein the request describes one or more inputs to the software function, one or more outputs of the software function that are used to generate a beam plan for a satellite, and one or more capabilities that the satellite must have for the software function to be used;

in response to receiving the request to register the software function of the application with the system manager, determining, by the system manager at the virtual hub server, one or more capabilities of the satellite;

determining, by the system manager at the virtual hub server, whether the determined one or more capabilities of the satellite satisfy the described one or more capabilities that the satellite must have for the software function that the software algorithms of the application module implement to be used with the satellite;

in response to determining that the determined one or more capabilities of the satellite satisfy the described one or more capabilities that the satellite must have for the software function that the software algorithms of the application module implement to be used with the satellite, (i) providing, by the system manager at the virtual hub server, to a client an indication that the software function of the application is available to be used with the satellite and a description of the one or more inputs to the software function and (ii) registering, by the system manager at the virtual hub server, the software function of the application module as available for use with the satellite where the registration of the software function enables the software algorithms included in the application module to be later called upon by the client to generate the beam plan;

receiving, by the system manager at the virtual hub server, a request from the client to generate the beam plan for the satellite that where the request both (i) indicates that the software function that was indicated to the client as available to be used with the satellite is to be used in the generation of the beam plan and (ii) indicates values for the one or more inputs to the software function;

in response to receiving the request from the client to generate the beam plan for the satellite using the software function that was indicated to the client as available to be used with the satellite, determining by the system manager at the virtual hub server, that the software function of the application module is registered as available for use with the satellite;

in response to determining that the software function of the application module is registered as available for use with the satellite, obtaining, by the system manager at the virtual hub server, the beam plan for the satellite using the one or more outputs of the software function in response to providing to the software function the values for the one or more inputs to the software function indicated in the request from the client to generate the beam plan; and transmitting, by the system manager at the virtual hub server, the beam plan to the satellite.

* * * * *